REMOTE STAGE SWITCHING NETWORK

Filed June 28, 1963 9 Sheets-Sheet 1

INVENTORS
PIERRE M. LUCAS & JEAN F. DUQUESNE
BY Abraham A. Saffitz
ATTORNEY

REMOTE STAGE SWITCHING NETWORK

Filed June 28, 1963 9 Sheets-Sheet 2

INVENTORS
PIERRE M. LUCAS & JEAN F. DUQUESNE
BY
Abraham A. Saffitz
ATTORNEY

REMOTE STAGE SWITCHING NETWORK

Filed June 28, 1963 9 Sheets-Sheet 3

INVENTORS
PIERRE M. LUCAS & JEAN F. DUQUESNE
BY
Abraham A. Saffitz
ATTORNEY

REMOTE STAGE SWITCHING NETWORK

Filed June 28, 1963 9 Sheets-Sheet 4

INVENTORS
PIERRE M. LUCAS & JEAN F. DUQUESNE
BY
Abraham A. Saffitz
ATTORNEY

INVENTORS
PIERRE M. LUCAS & JEAN F. DUQUESNE
BY
Abraham A. Saffitz
ATTORNEY

INVENTORS
PIERRE M. LUCAS & JEAN F. DUQUESNÉ
BY
Abraham A. Saffitz
ATTORNEY

INVENTORS
PIERRE M. LUCAS & JEAN F. DUQUESNE
BY
Abraham A. Saffitz
ATTORNEY

Sept. 20, 1966 P. M. LUCAS ET AL 3,274,343

REMOTE STAGE SWITCHING NETWORK

Filed June 28, 1963 9 Sheets-Sheet 8

INVENTORS

PIERRE M. LUCAS & JEAN F. DUQUESNE

BY

Abraham A. Saffitz

ATTORNEY

REMOTE STAGE SWITCHING NETWORK

Filed June 28, 1963 9 Sheets-Sheet 9

INVENTORS
PIERRE M. LUCAS & JEAN F. DU QUESNE
BY
Abraham A. Saffitz
ATTORNEY

United States Patent Office 3,274,343

Patented Sept. 20, 1966

3,274,343

REMOTE STAGE SWITCHING NETWORK

Pierre M. Lucas, 20 Rue Henri-Tariel, Issy-les-Moulineaux, France, and Jean F. Duquesne, 41 Rue Esquirol, Paris, France Filed June 28, 1963, Ser. No. 291,401
Claims priority, application France, June 30, 1962, 902,612
6 Claims. (Cl. 179—18)

This invention relates to an electronically controlled electromechanical switching network, more particularly of the crossbar kind comprising subscribers' selection stages and group selection stages, one kind of stage being disposed at one place and the other kind of stage being disposed at another place, the subscribers' selection stages forming satellite exchanges and the group selection stages forming a central exchange.

Switching network systems comprising satellite and central exchanges have been developed in the past along two main outlines according to whether the connection in the satellite exchange or concentrator between a subscriber's line and a trunk occur at random or is controlled by the central exchange. In the first case the subscriber's line code together with the trunk code (since the actually connected trunk is unknown to the central exchange) are to be transmitted between the satellite and central exchanges. It can be said that the trunk selection is made by the satellite exchange which informs the central exchange of this selection. In the second case the selection of the trunk is made by the central exchange among those trunks which are connected to the satellite exchange from which the call originated.

In the switching network of the invention, the selection of the trunk is made in two steps. First, when the call reaches the satellite exchange, a plurality of trunks are marked on the satellite exchange side, this marking being controlled by the operation of the select row electromagnets of the crossbar network in said satellite exchange. Then one out of the marked trunks is selected by the central exchange and this selection results in the operation of the hold column electromagnets of the crossbar network in the satellite exchange. The connection in the crossbar network in the central exchange is, as will be seen, quite similar to the connection in the crossbar network in the satellite exchange, junctors taking the place of the subscribers and trunks in the direction from the central to the satellite exchange the place of the trunks in the direction from the satellite to the central exchange.

The switches which form the subscriber's selection stages and the switches which form the group selection stages are crossbar switches formed by two frames of switches, each of the rows of any of the switches of the first frame being connected to a column of the switch of same rank in the second frame by link wires internal to the stage. The subscribers are connected to the multipled outputs of the switches of the second frame of the subscribers' selection stages, and the trunks between subscribers' selection stages and group selection stages are connected to the columns of the first frame of such subscribers' selection stages. The other ends of the between-stages trunks are connected to the multipled outputs of the switches of the second frame of the group selection stages. Junctors (JR) forming the entries of routes extending through the group selection stage and the subscribers' selection stage in cascade are connected to the columns of the first frame of the group selection stages and also to some columns of the first frame of the subscribers' selection stages. A connection between a calling subscriber and a called subscriber is built up in two phases. The calling subscriber is connected to a junctor at the central exchange solely via the subscribers' selection stage, during a route-selecting step known as preselection. This junctor once marked is connected to the called subscriber via the cascaded group selection stage and subscribers' selection stage during a route-selecting step called final route selection. The preselection step uses some column electromagnets in one subscriber selection stage—i.e. the one to which the calling subscriber is connected—and final route selection uses some column electromagnets in one subscribers' selection stage—i.e. the one to which the called subscriber is connected—and in one group selection stage—i.e. the one to which the junctor seized by the calling subscriber in preselection is connected.

According to the invention, the subscribers' selection stages at the satellite exchange and the group selection stages at the central exchange are interconnected by satellite-central trunks comprising preselection route wires and by central-satellite trunks comprising final selection route wires; the preselection route wires and final selection route wires can be marked by continuous potentials. The preselection route wires extend via make contacts of a subscribers' selection stage relay denoting the calling subscriber to the connected, and via break contacts of column electromagnets which must operate to connect to a junctor the said calling subscriber. There are therefore as many preselection route wires per subscribers' selection stage as there are junctors connected thereto. At the central exchange, a special circuit called the preselction route selector (PRS) operates—advised that a calling subscriber is marked as such in the subscribers' selection stage—to select one of those of the preselection route wires which are marked by a continuous potential, and to seize the junctor corresponding to the preselection route wire thus selected.

The final route wires between subscribers' selection stages and group selection stages extend via make contacts of a subscriber selection stage relay denoting the called subscribers to be connected and via break contacts of column electromagnets which must operate to connect the said called subscriber to a central-satellite trunk. There are therefore as many final route wires per subscribers' selection stage as there are central-satellite trunks connected thereto. Associated with each final route wire from the satellite exchange to the central exchange is a final route wire which is internal to the group selection stage and which extends via make contacts of a group selection stage central satellite trunk denoting relay and via break contacts of those column electromagnets which must operate to connect such central-satellite trunk to a junctor. Those final route wires which are internal to the group selection stage and those which are external and connect the same to the subscribers' selection stage and which both are associated with the same central-satellite trunk are connected to gating circuits, and at the central exchange a special circuit called a final route selector (FRS) operates—advised that a called subscriber is to be sought in the subscribers' selection stage—to select a gating circuit to which extend two final route wires simultaneously marked by a continuous potential and to seize the central-satellite trunk corresponding to the gating circuit thus selected.

The route wires which extend from the satellite exchange to the central exchange and which can be marked by a continuous potential obviate the need for any exchange of coded information between the satellite exchange and the central exchange about selecting and connecting a satellite-central or central-satellite trunk. The only information which still needs to be exchanged concerns the numbers of the calling subscriber and of the called subscriber, and an indication to the central exchange that selection or connection of a calling or called subscriber is proceeding or has terminated in the satellite exchange. The presence of route wires which can be marked in the satellite exchange by continuous potentials also enables the central exchange to select a route in accordance with the known principles of conjugate selection extended to the remote subscribers' selection stages.

Other features and advantages of the switching network according to the invention will become apparent from a study of the following detailed description, reference being made to the accompanying drawings wherein:

FIG. 1 diagrammatically illustrates a subscribers' selection stage, a group selection stage, and the column electromagnets and relays which must operate to set up a preselection route and a final route;

Figure 4A:
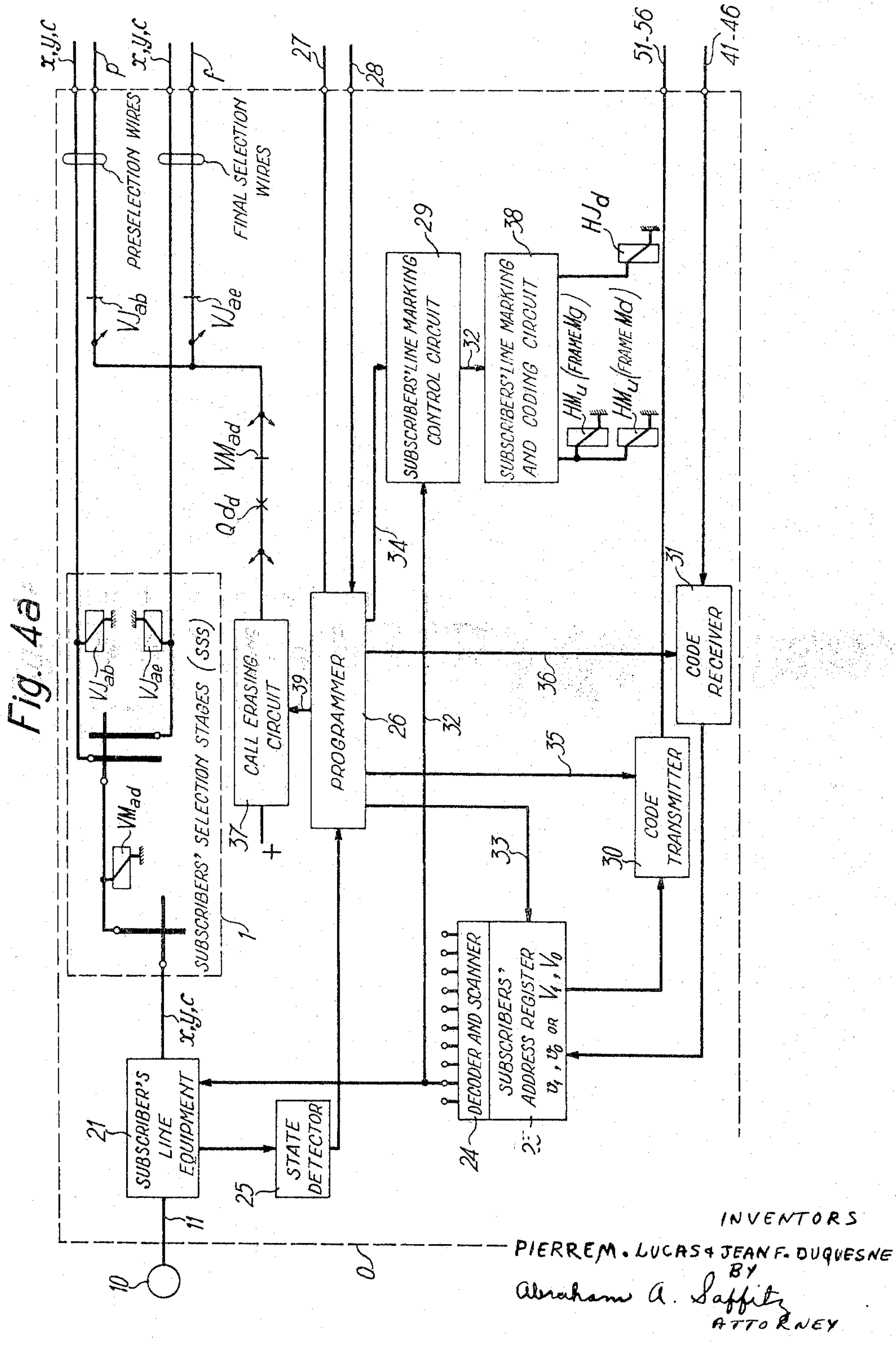
Figure 4B:
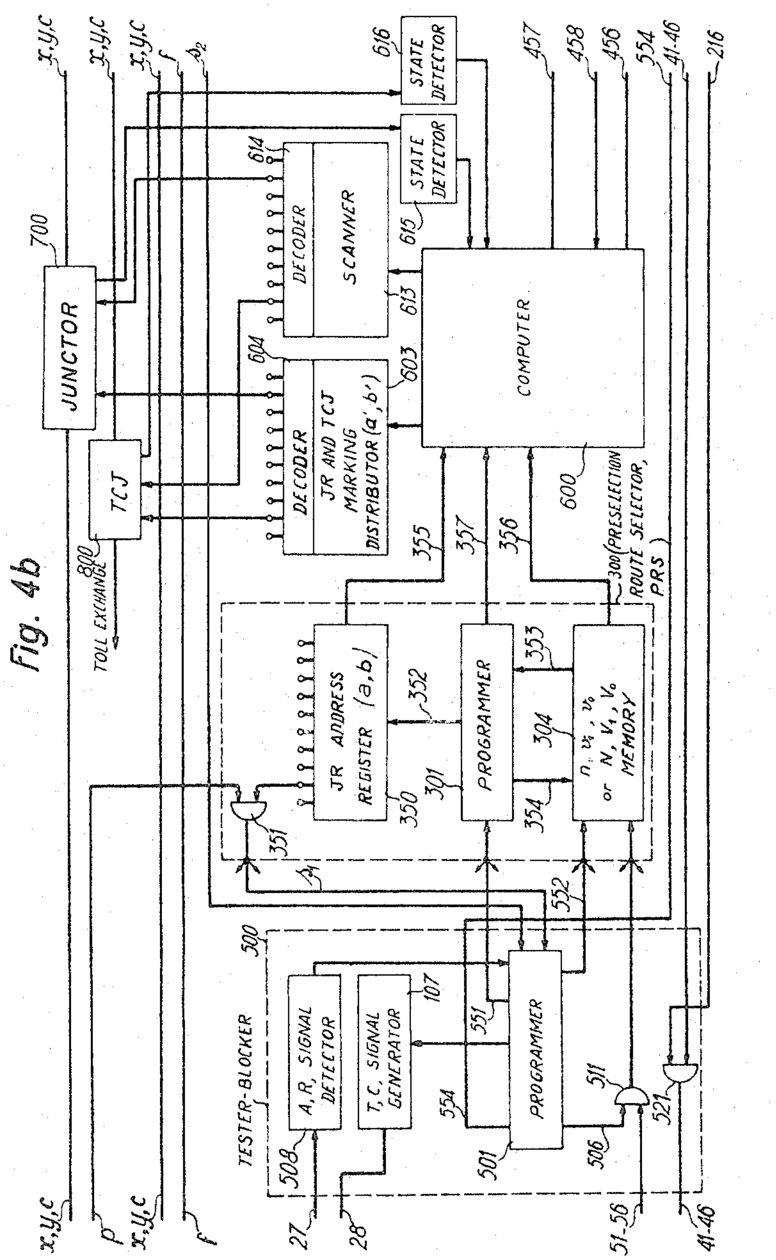
Figure 4C:
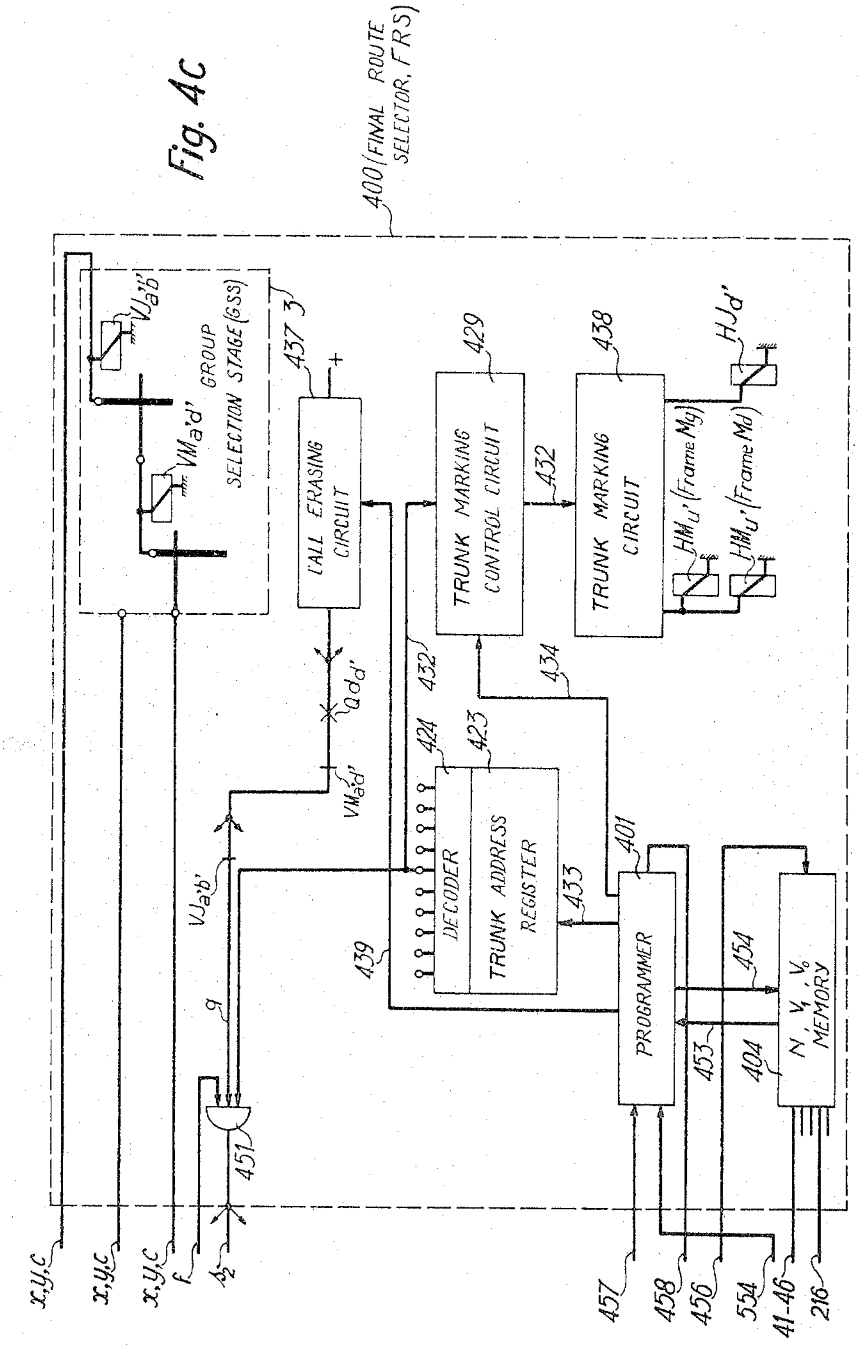
Figure 5:
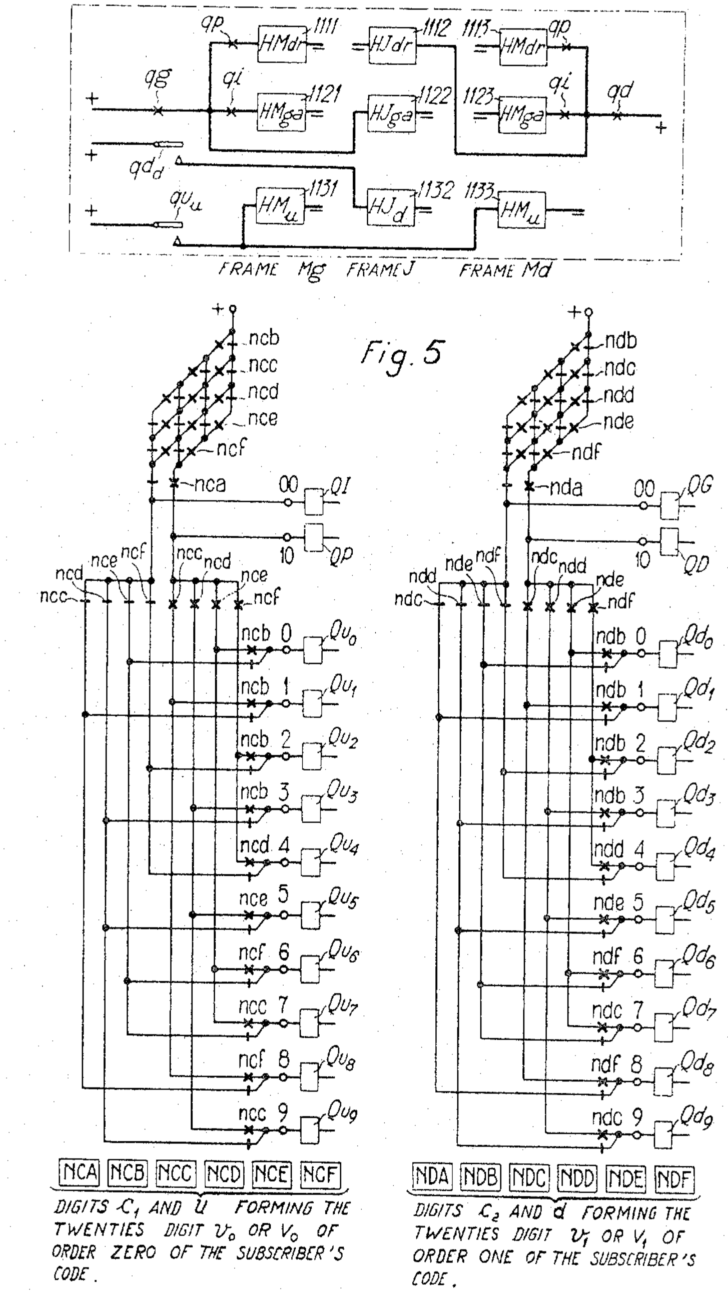
Figure 6:
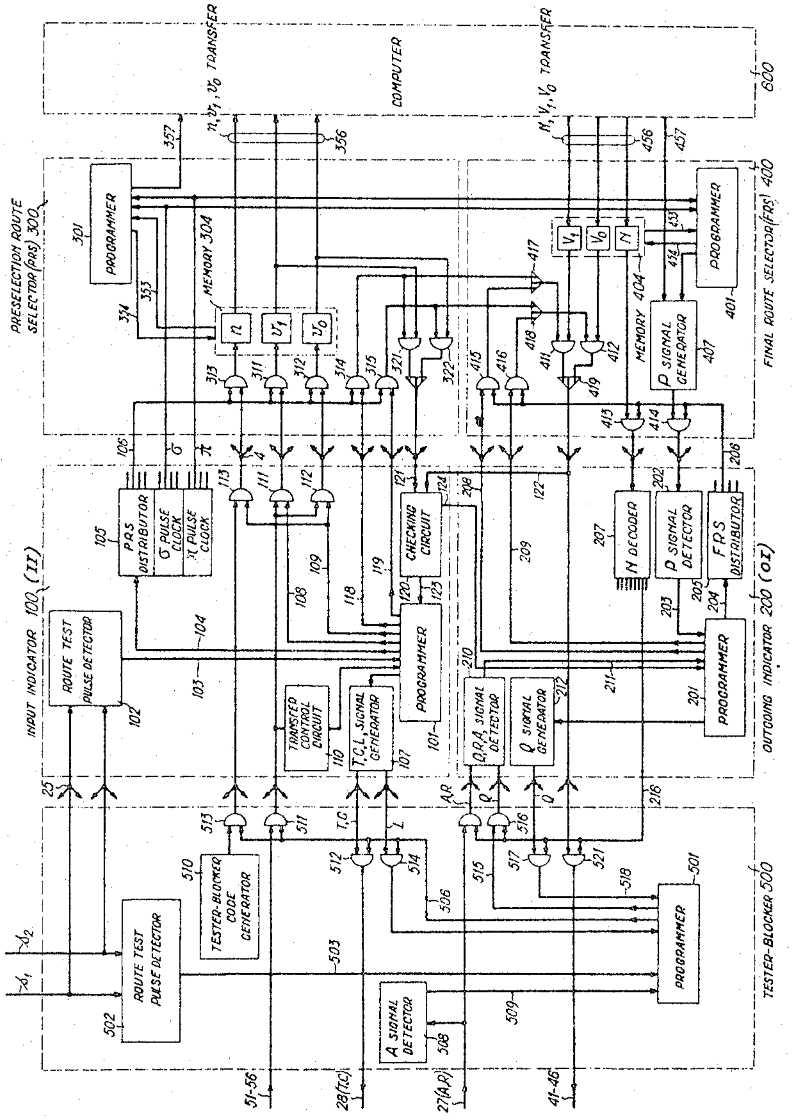

FIGS. 4*a*, 4*b* and 4*c* show in block schematic form the remote stage switching network according to the invention;

FIG. 5 illustrates a subscribers' address register and the means by which the same can control the row electromagnets of the subscriber selection stage;

FIG. 6 illustrates in detail the equipment of the central exchange, and

Figure 7:
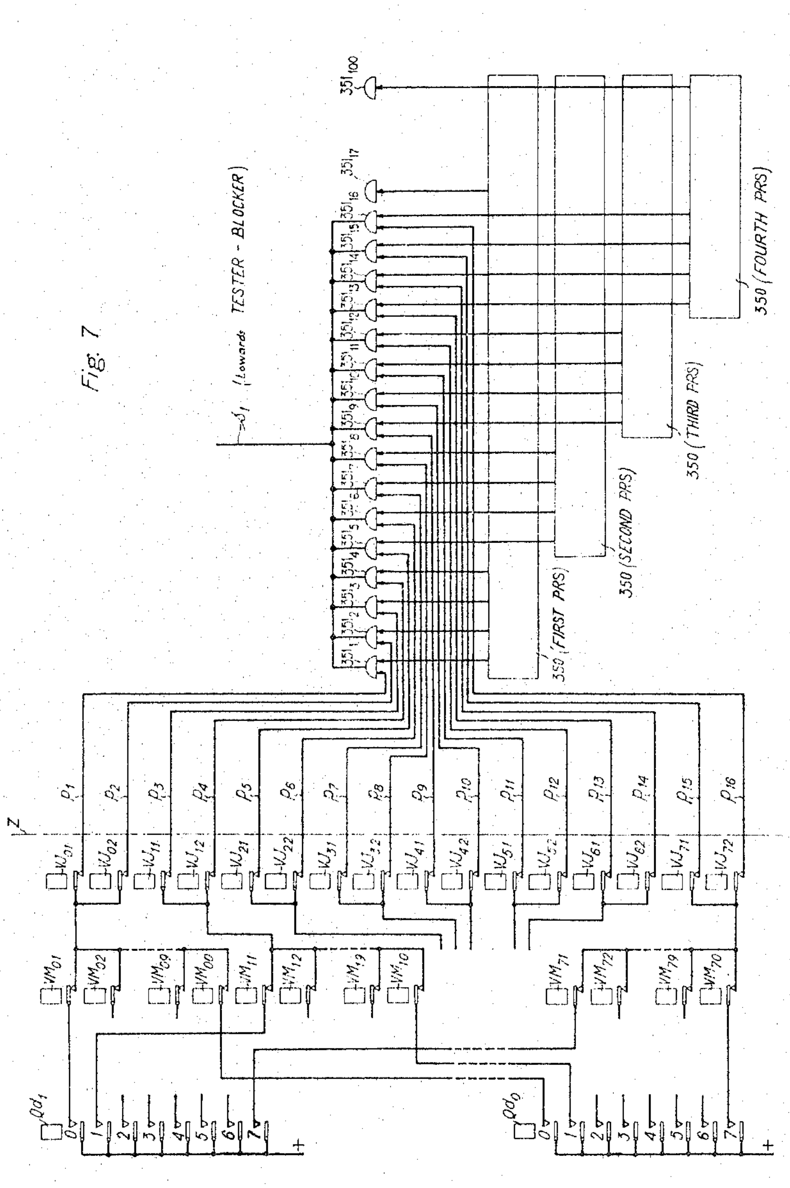

FIG. 7 illustrates the connections of the preselection route wires.

Figure 1:
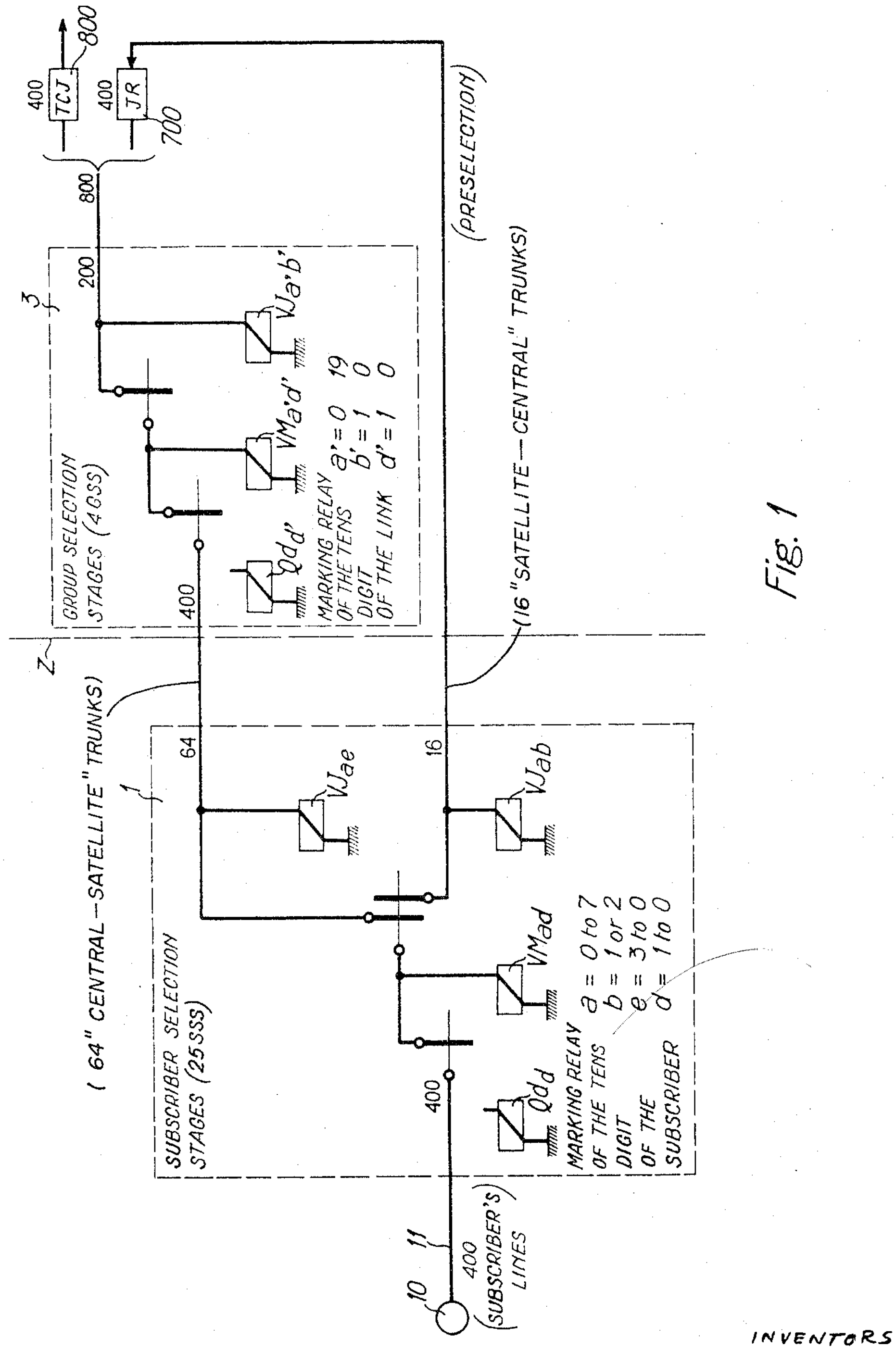

The system illustrated in FIG. 1 comprises 25 subscribers' selection stages 1 to each of which 400 subscribers, as 10, are connected by lines 11. The system illustrated in FIG. 1 also comprises 4 group selection stages 3. The subscribers' selection stages are disposed elsewhere than the group selection stages and the two kinds of stage are interconnected by three-wire connecting trunks and by route selection lines which are shown in FIG. 7 but not in FIG. 1. A chain line Z bounds the central exchange which is to the right of such line.

The switches of the system are crossbar switches. In the example described, the switches comprise 10 vertical lines or "columns" and 12 horizontal lines or "rows" each having an electromagnet, a hold electromagnet V for the columns and a select electromagnet H for the rows. The two final rows are used splitting bars and their select electromagnets will be referred to as H*dr*, H*ga*. Occasionally, H*dr* and H*ga* will be used to denote the rows and not just the select electromagnets, in order to prevent the proliferation of references.

It is conventional to use splitting to convert a 10 x 12 crossbar switch, in which each crosspoint comprises a stack of, for instance, 8 metal contacts operated simultaneously, into a 10 x 20 crossbar switch in which the crosspoint is formed by half the number of contacts of the 10 x 12 device—i.e. 4 contacts. The eight wires of a column are divided into two groups of four wires by the crosspoints between said column and the two splitting rows, each group of four wires constituting a partial column. The eight wires of a row are divided into two groups of four wires, left hand wires and right hand wires, and when a crosspoint closses its eight contacts it simultaneously connects together the first group of four column wires to the first group of four row wires and the second group of four column wires to the second group of four row wires. Since only a crosspoint pertaining to one splitting row is operating at a time, the connection between one of the column wire groups and one of the row wire groups remains inoperative.

Consequently, in a connection between any of the 10 columns and any of the 20 outlets, two contact stacks in the same column must be connected in series with one another, one such stack corresponding to one of the splitting rows H*dr* or H*ga* and the other corresponding to any of the other ordinary rows. Thus, connecting through a call means that two select electromagnets must operate before the operation of the column hold electromagnet which holds the call.

Figure 2:
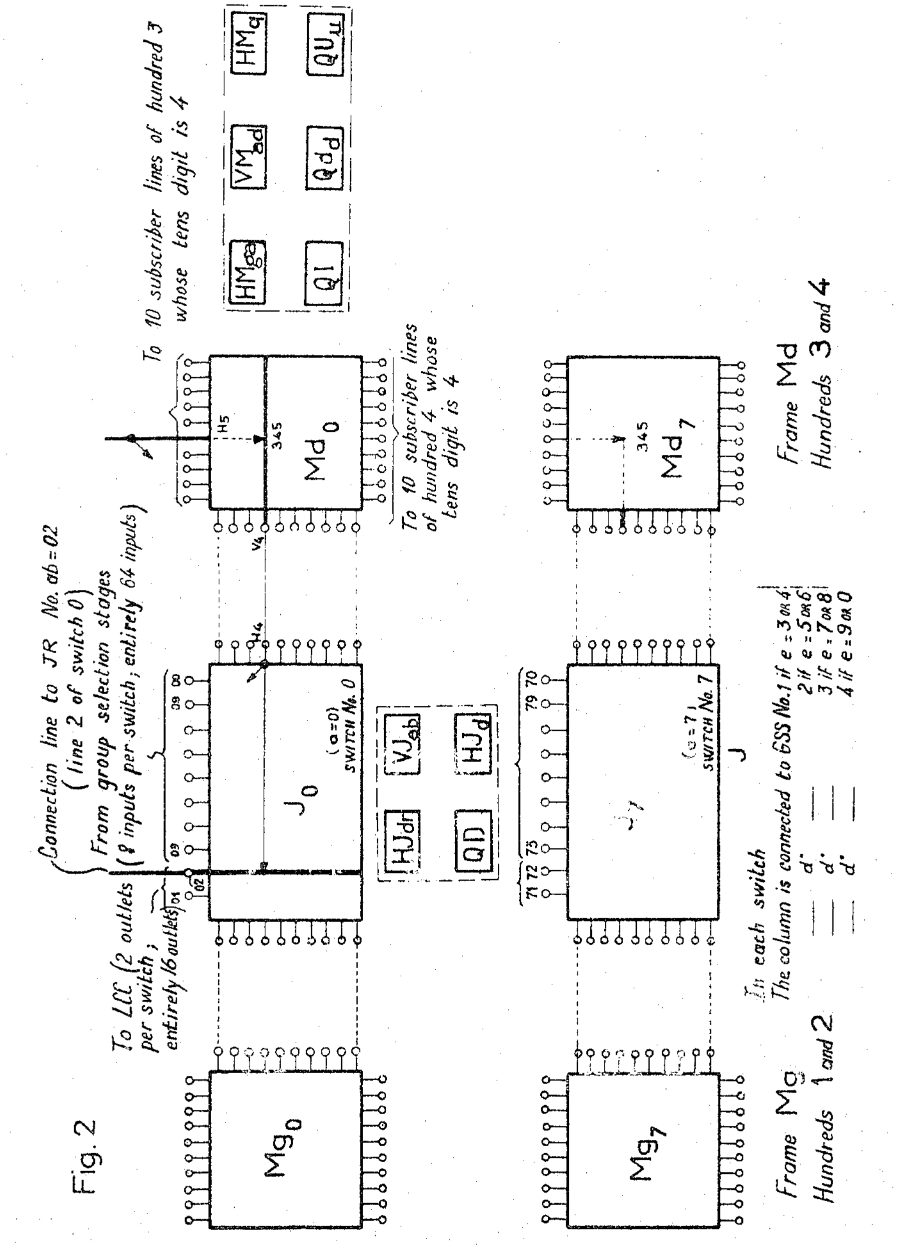
FIG. 2 illustrates the crossbar switches of the subscribers' selection stage.

To embody the subscribers' selection stage 1 by means of 10 x 20 crossbar switches of the kind specified, 24 crossbar switches are, as can be seen in FIG. 2, distributed between 3 frames each comprising 8 switches—two "link frames" hereinafter called the left link fram M*g* and the right link frame M*d*, and a "junction frame" hereinafter called frame J.

64 central-satellite trunks and 16 satellite-central trunks terminate individually at the column entries of the 8 switch-es $J_0$ to $J_7$ of frame J. The crosspoints of the switches of frame J are multipled horizontally so that there are 20 exits or outlets—10 to frame M*g* (denoted by the splitting row H*ga* and any of the 10 ordinary rows) and 10 to the frame M*d* (denoted by the splitting row H*dr* and any of the 10 ordinary rows). Every row exit of the crossbar switches of frame J is connected via a "link" to a column entry of the crossbar switch of like rank in a frame M. The subscribers' lines are connected to the exits row of the crossbar switches of the frames M*g* and M*d*.

Since the splitting enables each crossbar switch column to be connected to 20 exits and since the exits of any single crossbar switch are not multipled between one another, each crossbar switch of frame M has 200 exits or outlets. Like outlets of the 8 switches of the same frame M are multipled between one another and connected to a subscriber's line. Consequently, each of the two frames M serves 200 subscribers' lines, and each subscriber's line can be connected via 8 different crosspoints to 8 different links.

Each subscriber's line of a group of 400 such lines is defined by three digits—a hundreds digit, a tens digit and a units digit. Multipling is such that the left frame M*g* serves the first two hundreds (for instance, 1 and 2) and the right-hand frame M*d* serves the last two hundreds (3 and 4). In each frame M, if the call has been made by means of the splitting row select electromagnet H*ga* and of some other electromagnet, for instance, the electromagnet H*u*, the subscribers served are those of an odd hundred (for instance, 1 or 3) and, in such hundred, those subscribers whose units digit is *u*. If the link used is the one which connects the column of rank *d* of the crossbar switch of frame M to the row outlet of rank *d* of the switch of like rank of frame J, the subscribers served are those whose tens digit is *d*.

Other kinds of multipling are possible. In particular, multipling transposition may be useful—i.e. a subscriber's line having *d* as tens digit and *u* as units digit, instead of being connected, as just described, by means of a column electromagnet of rank *d* and a row electromagnet of rank *u* of any crossbar switch of a frame M, is connected in this manner only by the crossbar switches of the top half of frame M but is connected by the switches of the bottom half of the same frame M by means of a column electromagnet of rank *u* and a row electromagnet of rank *d*. This arrangement, of course, provides some reduction of the likelihood of internal blocking of the switching or connection system.

It may be deduced from the foregoing that:

A. To set up a connection to a group selection stage (*ae*) or a connection to a junctor (*ab*), it is required to know the rank of that crossbar switch of frame J where such line is disposed (let *a* denote such rank and lie between 0 and 7) and the rank of that column of the same crossbar switch to which the particular line concerned is connected (let *b* or *e* denote such rank, *b* being equal to 1 or 2 and *e* being equal to 3, 4, 5, 6, 7, 8, 9, 0). As can be seen in FIG. 2, connection line 02 is connected to the second column entry ($b=2$) of the first switch ($a=0$) of frame J.

B. To set up or define a subscriber's line, the hundreds digit (*c*), tens digit (*d*) and units digit (*u*) of the line must be given. The hundreds digit can conveniently be defined by an indication of whether the hundred is even or odd and whether it is in the left frame M*g* or the right frame M*d*. *d* denotes the tens digits and *u* denotes the units digits, and $c_1$, $c_2$ are two binary numbers which further decline the hundred, $c_1$=even-odd, and $c_2$=left-right.

To connect a subscriber's line ($c_1$, $c_2$, *d*, *u*) to a connection line (*a*, *b*), there is only one route, and the same is found to correspond to the following electromagnets:

In frame J: column electromagnet $VJ_{ab}$ of rank *b* of the crossbar switch of rank *a* of the frame, while the row splitting electromagnet is:

H*ga* if $c_2=1$ or
H*dr* if $c_2=0$, and the normal row electromagnet $H_d$ of rank *d*.

In frame M: column electromagnet $VM_{ad}$ of rank *d* of the crossbar switch of rank *a* on the frame, while the row splitting electromagnet is:

H*dr* if $c_1=0$ (even hundred) or
H*ga* if $c_1=1$ (odd hundred), normal row electromagnet $H_u$ of rank *u*.

As can be seen in FIG. 2, the connection of connection line 02 to subscriber's line 345 uses the following electromagnets:

in frame J: $VJ_{02}$, H*dr*, $HJ_4$
in frame M*d*: $VM_{04}$, H*ga*, $HM_5$

If *a* denotes crossbar switches in the bottom half of the frames J, there must be transposition of the digits *d* and *u* if multiplying transposition is used.

Figure 3:
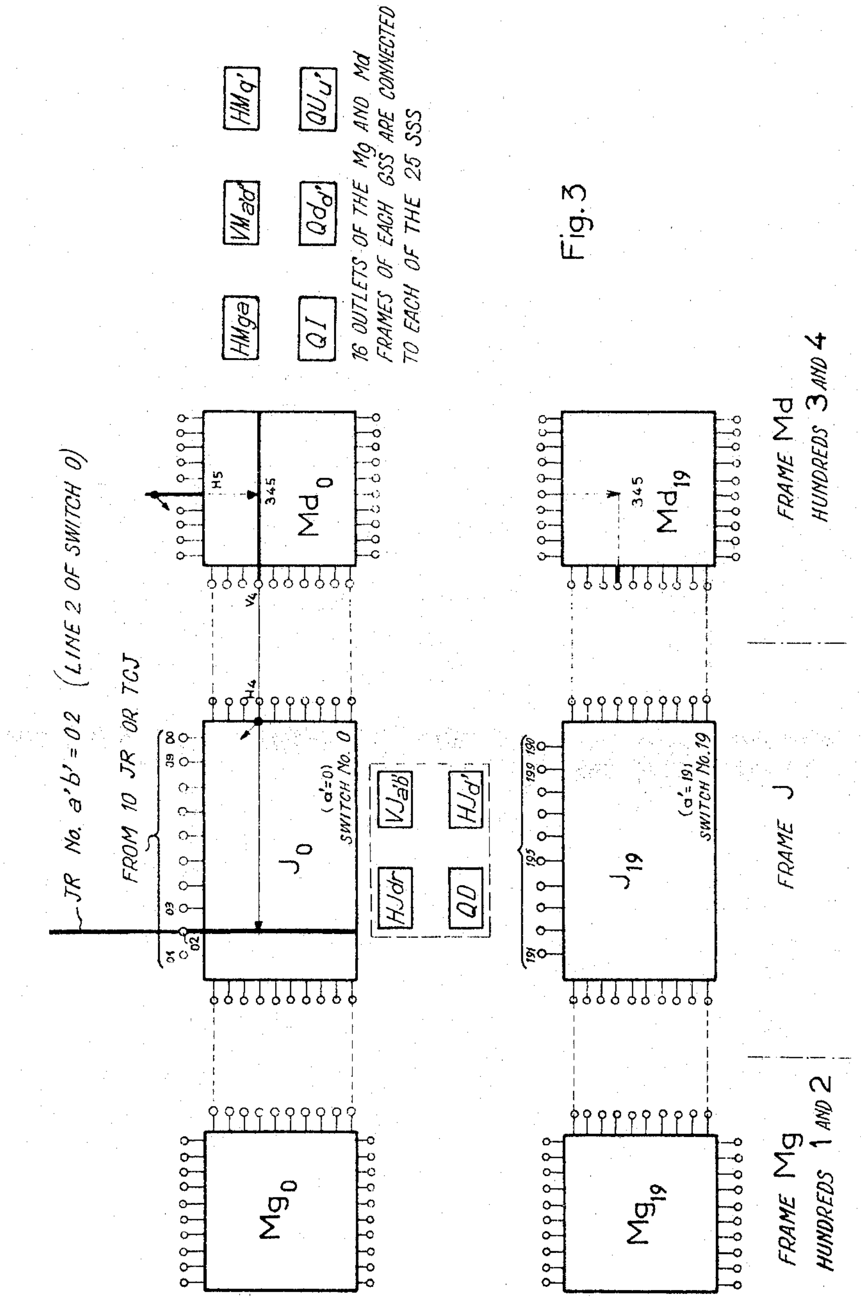
FIG. 3 illustrates the crossbar switches of the group selection stage.

The group selection stages (GSS) are shown in FIG. 3. Each comprises three crossbar switch frames J, M*g* and M*d* each comprises 20 switches. Connected to the columns of frame J of any of the group selection stages is a set of 10 junctors for instance five local junctors (JR) and five toll call junctors (TCJ). Since there are 400 local junctors and 400 toll call junctors—i.e. a total of 800 junctors—the same are connected to the 4 group selection stages in a proportion of 200 per group selection stage. Connected to the rows of frames M*g* and M*d* are 400 trunks for connection to the subscribers' selection stages, in the proportion of 16 such connecting trunks to each of the 25 subscribers' selection stages.

In short, therefore, a subscriber's number comprises four binary digits $c_2$, *d*, $c_1$, *u*. The digits $c_2$, *d* form a first twenties number which will hereinafter be called a twenties number of order one and given the reference $v_1$ or $V_1$, depending upon whether it is used for the calling subscriber or for the called subscriber, and the digits $c_1$, *u* form a second twenties number which will hereinafter be called a twenties number of order zero and given the reference $v_0$ or $V_0$, depending upon whether it is used for the calling subscriber or for the called subscriber. Also, the exit address of any local junctor (JR) in a subscribers' selection stage comprises two digits—one, *a*, denoting the number of the switch in the frame J, and the other, *b*, denoting the column number of the frame J. The entry address of any local junctor (JR) or of any toll call junctor (TCJ) in a group selection stage comprises two digits—one, *a'*, which denotes the number of the switch in frame J, and the other, *b'*, which denotes the column number of frame J. A trunk between a group selection stage (GSS) and a subscribers' selection stage (SSS) has two addresses—an entry address having two digits—one, *a*, denoting the number of the switch in the frame J, and the other, *e*, denoting the column number in frame J of the subscriber selection sage—and an exit address comprising four digits *d'*, *u'*, $c'_1$, $c'_2$ (which are the analogues of *d*, *u*, $c_1$, $c_2$).

A preselection connection therefore comprises the control of a column electromagnet $VJ_{ab}$ of a column electromagnet $VM_{ad}$ in a subscriber selection stage, and a final connection comprises the control of a column electromagnet $VJ_{a'b'}$ and of a column electromagnet $VM_{a'd'}$ in a group selection stage, and of a column electromagnet $VJ_{ae}$ and of a column electromagnet $VM_{ad}$ in a subscribers' selection stage.

Referring now to FIGS. 4*a*, 4*b* and 4*c*, the satellite exchange O comprises a code receiver 31 and a code transmitter 30. The code transmitter is connected by six-wire lines 51–56 to a preselection route selector (PRS), 300, at the central exchange via the tester-blocker 500 associated with the satellite exchange. The code receiver 31 is connected via a six-wire line 41–46 to the final route selector (FRS), 400, at the central exchange via the tester-blocker 500 associated with the satellite exchange. The wires 51–56 also extend to an incoming indicator, II, 100, and the wires 41–46 extend to an outgoing indicator OI, 200; the purpose of these indicators will be described hereinafter. The preselection route selector PRS 300 comprises a memory 304 which is connected to the code transmitter 30 via the wires 51–56 and the code transmitter 30 can transfer to the memory 304, in parallel "three amongst six" binary code, the twenties numbers $v_1$ of order one and the twenties numbers $v_0$ of order zero of the calling subscriber. The satellite number *n*—i.e. the number of the subscribers' selection stage comprising the calling subscriber—is transmitted to memory 304 by the tester-blocker 500 through connection 552, for instance, in a conventional parallel binary code. The final route selector FRS 400 comprises a memory 404 which is connected to the code receiver 31 by the wires 41–46 and which can transfer to the code receiver 31, in "three amongst six" parallel binary code, the twenties numbers $V_1$ of order one and the twenties numbers $V_0$ of order zero of the called subscriber. The memory 404 also "knows" the number N of the satellite exchange of the called subscriber—i.e. the number of the subscriber selection stage comprising the called subscriber. The number N is used by the final route selector—or, more accurately, as will be seen hereinafter, by the outgoing indicator associated with the final route selector—to select via the connecion 216 the tester-blocker 500 corresponding to the subscribers' selection stage to which the called subscriber belongs.

Each subscriber's line 11 conneced to a subscriber 10 comprises subscriber's line equipment 21 which, in accordance with the electrical state of appropriate elements such as relays or trigger states, detects whether or not the subscriber's line is looped and whether or not it is connected. The subscriber's line equipment 21 can be, for instance, the conventional calling relay and cut-off relay of the subscribers' line of electromechanically switched systems.

The code transmitter 30 and code receiver 31 are connected to a subscriber address register 23 associated with a combined decoder and scanner 24 having a number of outlets connected to subscriber's line equipments 21. The same are also connected to a state detector 25 whose output is connected to a programmer 26. The same acts: (i) via wires 33, to control shifting or stoppage of the register 23 and to transfer the data therein to the code transmitter 30 or to transfer the data in the code receiver 31 to the register 23; (ii) via wires 34, to transfer the data in the register 23 to a subscriber's line marking and coding circuit 38; (iii) via a wire 35, to control transmission by the code transmitter 30 of its data to the central exchange via the lines 51–56, and (iv) via a wire 36 to control reception by the code receiver 31 of data transmitted to it from the central exchange via the lines 41–46.

An organization comprising an address register associated with a decoder, subscriber's line equipments, a state detector, a programmer, a code transmitter, a code receiver and a subscriber's line marking and coding circuit, for finding calling lines, recording the number thereof in the address register and transferring such number to the code transmitter and to the subscriber's line marking and coding circuit to energize the crossbar switch electromagnets, and for receiving a called subscriber's number first in the code receiver, then in the address register, marking the called subscriber's line and transferring its number to the called subscriber's line marking and coding circuit to energize the crossbar switch electromagnets is known in the art and is describer in detail, for instance, in U.S. Patent No. 3,206,553 issued on September 14, 1965, to the present applicants. Although the numbers and codes of the calling subscriber and called subscriber are transferred in series binary code in such patent, as compared with the parallel code used in the present case, the organization diagrams are similar enough for the engineer in the art to be readily able to make the required changes.

When a calling line has been found by the state detector 25 during the cyclic search of calling subscribers' lines effected by the address register 23, such detector delivers a signal to the programmer 26 which delivers a signal to the register 23 via wire 33 to stop shifting. The address of the calling line is transmitted from the register 23 to the relays of the marking and coding circuit 38 via the connecting wires 32 which are provided to a number equal to the number of stages of the address register 23, and via the called subscriber's line marking control circuit 29. The transfer is controlled by a signal supplied via the connecting wire 34 by the programmer 26 to the subscriber's line marking control circuit 29.

FIG. 5 shows, for the sake of completeness, a way in which 12 coding relays NCA–NCF and NDA–NDF disposed in the marking and coding circuit 38 and each associated with one of the 12 trigger stages CA/CF and DA/DF of the address register 23 are connected to the marking relays QG, QD, $Qd_0$ and $Qd_9$ which translate the twenties number of order one $v_1$ or $V_1$, and to the marking relays QI, QP, $Qu_0$ to $Qu_9$ which translate the twenties number of order zero, $v_0$ or $V_0$. Also visible in FIG. 5 are row electromagnets HM*dr* 1111, HJ*dr* 1112, HM*dr* 1113, row electromagnets HM*ga* 1121, HJ*ga* 1122, HM*ga* 1123 of frames M*g*, J and M*d*, tens row electromagnets $HJ_d$ 1132, and units row electromagnets $HM_u$ 1131 and 1133. The coding relays NCA–NCF, NDA–NDF have contacts *nca–ncf, nda-ndf*; make contacts are denoted by a cross and break contacts are denoted by a vertical line or dash. The relay QI or QP and one of the relays $Qu_0$ to $Qu_9$, for instance, the relay $Qu_u$, is operated by each combination of the "three amongst six" binary code which represents a number $v_0$ or $V_0$; similarly, the relay QG or QD and one of the relays $Qd_0$ to $Qd_9$, for instance, the relay $Qd_d$, is operated by each combination of the "three amongst six" binary code representing the number $v_1$ or $V_1$. For further detail about the "three amongst six" code, reference can be made to the aforesaid patent.

As will be apparent from FIG. 5, when relay QG is operated, the splitting electromagnet HJ*ga* 1122 picks up; similarly, when QG and QP are operated, HM*dr* 1111 picks up, and when QG and QI are operated HM*ga* 1121 picks up. In a symmetrical fashion, when relay QD is energized the splitting electromagnet HJ*dr* 1112 picks up; when QD and QP are operated, HM*dr* 1113 picks up, and when QD and QI are operated, HM*ga* 1123 picks up. The operation of $Qd_d$ leads to $HJ_d$ 1132 picking up, and the operaiton of $Qu_u$ leads to $HM_u$ 1133 picking up.

The subscribers' selection stage 0 and the preselection route selector 300 are interconnected by preselected route wires *p*—i.e. by wires which extend via contacts of column electromagnets of the subscribers' selection stage switches which must operate to connect a subscriber having a given tens digit *d* to a junctor. Since a subscriber having the tens digit *d* is denoted by the marking relay $Qd_d$, and since the column electromagnets $VM_{ad}$ and $VJ_{ab}$ must be operated to connect such subscriber to the junctor of address (*a, b*), the wires *p* extend via make contacts of the relays $Qd_d$, then via break contacts of the electromagnets $VM_{ad}$, the break contacts of the electromagnets $VM_{a1}$ to $VM_{a0}$ being multipled as between one another and connected to break contacts of the electromagnets $VJ_{ab}$.

Referring to FIG. 7, which shows the connections of the preselection route wires *p*, it will be seen that, for instance, the marking relay $Qd_1$ has 8 contacts 0 to 7 (since *a* lies between 0 and 7), the make contact 0 of $Qd_1$ is connected to the break contact of $VM_{01}$, the break contacts of $VM_{01}$ to $VM_{00}$ are multipled as between one another and connected to break contacts of $VJ_{01}$ and $VJ_{02}$. The two outgoing *p* wires, which have the references $p_1$ and $p_2$, extend from the satellite exchange to the central exchange to gating circuits $\mathbf{351}_1$, $\mathbf{351}_2$ therein associated with the junctors. There are 16 wires $p_1$ to $p_{16}$ and 16 gating circuits $\mathbf{351}_1$ to $\mathbf{351}_{16}$ associated with any one subscriber's selection stage and they are distributed between the four preselection route selectors; there are therefore 100 gating circuits like 351 in any preselection route selector, in the proportion of four from any subscribers' selection stage. The gating circuits 351 are scanner cyclically, as will be described hereinafter.

The subscribers' selection stage 0 and the final route selector 400 are interconnected by final route wires *f*—i.e., by wires which extend via contacts of the column electromagnets of the subscriber selection stage switches which must operate to connect a subscriber having a given tens digit *d* to a given trunk between the subscribers' selection stage and the group selection stage. Since a subscriber having the tens digit *d* is denoted by the marking relay $Qd_d$ and the column electromagnets $VM_{ad}$ and $VJ_{ae}$ must be operated to connect such subscriber to the trunk of address (*a, e*), the wires *f* extend via make contacts of the relays $Qd_d$, then via break contacts of the electromagnet $VM_{ad}$, the break contacts of the electromagnets $VM_{a1}$ to $VM_{a0}$ being multiplied as between one another and connected to break contacts of the electromagnets $VJ_{ae}$. The wiring diagram is not shown and is similar to what can be seen in FIG. 7, remembering that in FIG. 7, $b=1$ or 2, whereas in the present case $e=3, 4, 5, 6, 7, 8, 9, 0$. There are therefore 4 times as many wires *f* as there are wires *p*—i.e., there are 64 wires *f* per subscriber selection stage. There is therefore a total of 400 gating circuits 451—to which the wires *f* are connected—in a final route selector, and of the total of 1600, 64 are associated with any particular subscriber selection stage.

Since the final route must comprise, as well as a route through a subscribers' selection stage, a route through a group selection stage, each gating circuit 451 is also connected to a wire *q* which, for a given tens digit link *d'*, extends via a make contact of marking relay $Qd_{d'}$, via break contact of the electromagnets $VM_{a'd'}$ of the group selection stage, and via a break contact of the electromagnets $VJ_{a'b'}$ thereof. The connections for the wires *q* are similar to the connections for the wires *p* as shown in FIG. 7, remembering that *a'* is between 0 and 19, as compared with the 0 to 7 for *a*, and *b'* is between 1 and 0, as compared with 1 or 2 for *b*.

When particular marking relays have operated in the coding and marking circuit 38, a continuity is produced on some wires *p* and the wires affected are marked by a continuous potential. Via wire 27, programmer 26 transmits a signal (signal A) to the tester-blocker 500 associated with the particular subscribers' selection stage where the call has occurred, to give an indication that a subscriber is calling. The tester-blocker 500 (of which there are 25) is immediately marked unavailable for final selection operations, while those of the four preselection route selectors which are free distribute pulses. Via wire 352, the programmer 301 of each of these free preselection route selectors transmits shift pulses to the address register 350 for local connection circuits, and such register applies control pulses sequentially to the gating circuits 351 associated with the junctors. The output wire $s_1$ of the first of the gates 351 marked by their wire *p* to be actuated receives a control pulse which is transmitted to the tester-blocker 500. Each tester blocker has a wire $s_1$ interconnecting the outputs of the 16 gates 351 which correspond to the junctors connected to the subscribers' selection stage with which the tester-blocker is associated; there are therefore 25 wires $s_1$ and 16 gating circuits 351 multipled on each wire $s_1$. Upon receipt of a signal via its wire $s_1$, the tester-blocker 500 acts by way of the wire 551 to block all the preselection route selectors 300 and connects itself to that preselection route selector 300 which has found the junctor, in the sense that the wires 51–56 over which the calling subscriber's code is transmitted from the satellite exchange to the central exchange and which were normally interrupted by the closed gating circuits 511 (of which there are six) are closed again because of the last-mentioned gating circuits being opened by way of the wire $s_1$, the programmer 501 and the wire 506.

The tester-blocker 500, warned by the wire $s_1$ that a wire $p$ and therefore a junctor have been selected, transmits a first signal (signal T) over wire 28 to programmer 26. The same transmits a first signal via wire 35 to code transmitter 30 which transmits the twenties digit $v_1$ of order one via wires 51–56 to the preselection route selector memory 304. After transmission of this first digit, memory 304 transmits via wire 353 a signal to the preselection route selector programmer 301 which transmits a signal to the tester-blocker 500 via the stopped junctor register 350 and the wire $s_1$. The tester-blocker 500 transmits a second signal T via wire 28 to programmer 26 which then transmits a second signal via wire 35 to code transmitter 30. The same transmits the twenties digit $v_0$ of order zero to the memory 304. After transmission of the second digit, there is a further transmission of a signal from memory 304 to programmer 301 via wire 353, transmission of a signal from programmer 301 to the tester-blocker 500 via the stopped register 350 and the wire $s_1$, transmission of a signal T from the tester-blocker 500 to the programmer 26 via the wire 28, and transmission of a signal from the programmer 26 to the call cancelling circuit 37. The previously open gate 351 closes; the tester-blocker 500 notes the closure, transmits an unblocking order via wire 551 to the preselection route selectors 300 and, via wire 552, transfers to memory 304 the number of the subscriber selection stage associated with the caller. All the preselection route selectors 300 release except for that one in the memory 304 in respect of which the caller's number ($v_1$, $v_0$) and the number $n$ of the subscriber selection stage of the calling subscribers' have been registered.

The caller's number and his subscribers' selection stage number are known, being registered in memory 304; also known is the number ($a$, $b$) of the junctor 700 which has been seized, and the address register of the junctors 350 has at present stopped on this number ($a$, $b$). Programmer 301 transmits a transfer preparation order to computer 600 via wire 357, a transfer order to register 350 via wire 352, and a transfer order to memory 304 via wire 354, whereafter the numbers of the caller ($v_1$, $v_0$), of his subscribers' selection stage $n$, and of the junctor ($a$, $b$) are transferred to computer 600 via wires 356, 355 respectively. The computer 600 deduces the output number ($a'$, $b'$) of the junctor from its input number ($a$, $b$) and earths the junctor (JR) 700 to mark the same through the agency of a marking distributor 603 of local junctors and toll call junctors associated with a decoder 604. The earth is applied to wire $c$ (on the preselection side), so that the column electromagnet $VJ_{ab}$ of frame J, the column electromagnet $VM_{ad}$ of frame M, and the subscriber's line equipment 21 which marks the calling line as connected operate. If, for instance, as has been assumed, the subscriber's line equipment 21 is merely the conventional subscriber's calling relay and cut-off relay, earthing wire $c$ operates the subscriber's cut-off relay. Operation thereof is detected by the state detector 25. By the termination of signal A on wire 27, programmer 26 releases the seized tester-blocker 500. Speech wires $x$, $y$ are extended to the junctor 700 and the first part of the connection, that between the calling subscriber and the junctor, is achieved.

The row electromagnets $HM_u$, $HJ_d$ were brought into the operative state when the caller's number was transferred from the register 23 to the coding and marking circuit 38, as described with reference to FIG. 5.

Each junctor 700 is also connected to a scanner 613 associated with a decoder 614 and to a scanner response circuit or state detector 615, and the scanner 613 and state detector 615 are connected to the computer 600. The called subscriber's number received by the junctor 700 is scanned by analyzing pulses transmitted by scanner 613 and detected when they call forth a positive response of the state detector 615. The called subscriber's number ($V_1$, $V_0$) is therefore analyzed and stored in computer 600 and the latter knows, via a memory, the number N of the subscribers' selection stage of the subscriber being called. These data must be transmitted to a final route selector, FRS 400. Via wires 456, computer 600 gates to memory 404 of whichever final route selector 400 is associated with the group selection stage covering the particular junctor 700 required, the twenties digit $V_1$ of order one, the twenties digit $V_0$ of order zero, and the number N of the subscribers' selection stage of the called subscriber.

The final route selector 400 is then connected to the tester-blocker 500 whose number N is registered in memory 404 in the sense that the wires 41–46 for transmitting the called subscriber's code from the central exchange to the satellite exchange, such wires normally being interrupted by the closed gating circuits 521 (of which there are 6) are closed by the circuits 521 opening. In this case, however, the gating circuits are not open via the wire $s_2$ and the programmer 501 as were the gating circuits 511 via the wire $s_1$ and the programmer 501. The reason for this is that, whereas the gating circuits 351 were marked only by a route through the subscriber's selection stage, the gating circuits 451 corresponding to the central-satellite trunks are marked by a route through the subscriber's selection stage and a route through the group selection stage, and since the line equipment of the called subscriber has still not been marked, this trunk has still not been denoted. The gating circuits 521 are opened via a special wire 216 of a given tester-blocker. Programmer 401 then orders memory 404, via wire 454, to transfer the numbers $V_1$ and $V_0$ to the code receiver 31 via the wires 41–46 which have just been closed. Via wire 28 the tester-blocker 500 transmits a first signal (signal C) to programmer 26. The same then transmits a first signal via wire 36 to code receiver 31 which transfers the twenties digit $V_1$ of order one to the address register 23. Upon receipt of such digit, the programmer 26 transmits a signal R via wire 27 to the tester-blocker. A second signal C is transmitted to programmer 26 to control transfer of the twenties digit $V_0$ of order zero into the register 23. The same and the associated decoder then mark the line equipment 21 of the called subscriber, and the state detector 25 receives a signal and gates the same to the programmer 26. The row electromagnets corresponding to the tens digit and units digit of the called subscriber, and the marking relay $Qd_{d'}$ operate. As in the case of a calling subscriber, programmer 26 transmits via wire 27 a signal (signal A) to the tester-blocker 500 to warn the same that a final route must be selected. The tester-blocker transmits via wire 554 an order to the programmer 401 of the final route selector 400. Via wire 433, programmer 401 transmits shift pulses to the trunk address register 423 which applies control pulses sequentially to the gating circuits 451. Extending thereto, as already described, are wires $f$ which extend via a make contact of relay $Qd_d$ ($d$ denoting the tens digit of the called subscriber in the subscriber selection stage), a break contact of a column electromagnet $VM_{ad}$, and a break contact of a column electromagnet $VJ_{ae}$. Also extending to the gating circuits 451 are wires $q$ which extend via a make contact $Qd_{d'}$ ($d'$ denoting the tens digit of the trunk used in the group selection stage), a break contact of a column electromagnet $VM_{a'd'}$, and a break contact of a column electromagnet $VJ_{a'b'}$.

The register 423 scans the gates 451. The output wire $s_2$ of that of the gates 451 marked by their wires $f$ and $q$ which is the first to be actuated receives a control pulse which is transmitted to the tester-blocker 500. The same then acts via wire 554 to block all the final route selectors. Thereafter, as in the case of a preselection route selector, a signal T is transmitted via wire 28 to programmer 26, a first signal is transmitted via wire 35 to code transmitter 30 which transmits via wires 51–56 to the memory 304 of the preselection route selector associated with the final route selector concerned the twenties digit $V_1$ of order one of the called subscriber, a second signal T is transmitted via wire 28, and the code transmitter 30 transmits to memory 304 the twenties digit $V_0$ of order zero of the called subscriber. As will be described hereinafter, the called subscriber's number registered in memory 304 and the called subscriber's number registered in memory 404 are then compared. If the comparison is correct, the final route selector, before releasing, transmits a signal via wire 458 to computer 600 which marks the wire $c$ (on the final selection side) of the local connection circuit. The column electromagnets $VJ_{a'b'}$, $VM_{a'd'}$, $VJ_{ae}$, $VM_{ad}$, ($d$ denoting the tens digit of the called subscriber) therefore pick up. The cut-off relay of the called subscriber picks up and the state detector 25 ceases to receive a signal. The programmer 26 stops the signal A being transmitted to the tester-blocker, and the same releases and transmits a release signal via wire 554 to the final route selector 400.

When the trunk address register 423 has found an open gating circuit 451, the programmer 401 is advised of the fact by a signal transmitted via wire 554 and transmits a signal via wire 434 to a trunk marking control circuit 429 disposed between the trunk address register 423 and a trunk marking circuit 438. The trunk number ($c'_1$, $c'_2$, $d'$, $u'$) is gated to the marking circuit 438 via wires 432 in just the same way as the calling subscriber's line number ($c_1$, $c_2$, $d$, $u$) was transferred to the coding and marking circuit 38 via wires 32. Row electromagnets $HM_{u'}$, $HJ_{d'}$ of the group selection stage are operated in the same way as were the row electromagnets $HM_u$, $HJ_d$ of the subscriber's selection stage in connection with FIG. 5. Speech wires $x$, $y$ are extended from the junctor 700 and the second part of the connection, that between the junctor and the called subscriber, is achieved.

FIG. 6 is a more detailed view of a tester-blocker 500, a preselection route selector 300, and a final route selector 400, and shows that some of the orders transmitted between the tester-blocker 500 and the preselection route selector 300 are not direct, as has so far been assumed, but are given by way of a unit 100 known as incoming indication circuit, II; similarly, some of the orders transmitted between the final route selector 400 and the tester-blocker 500 are not direct, as previously assumed, but are given by way of a unit 200 known as outgoing indication circuit, OI.

The incoming indicator II has terminals which will be called input terminals (although outgoing signals appear on a very few of them) which are connected by multipling to the 25 tester-blockers. It also has output terminals which are multiple-connected to the four preselection route selectors.

The incoming indicator performs a number of jobs;

(a) It defines times intervals allotted to each preselection route selector and each final route selector, and it is connected to whichever preselection route selector which operated in preselection route testing. It accordingly comprises a shift pulse and release pulse distributor 105 which distributes shift pulses $\pi_i$ ($i$=1, 2, 3, 4) for shifting the preselection route selector register—i.e. the junctor address register 350—and the final route selector register—i.e. the trunk address register 423—and test pulses $\sigma_i$ ($i$=1, 2, 3, 4) for transmission via the test wires $s_1$ and $s_2$. The pulses are produced at time positions which distinguish the first, second, third and fourth preselection route selectors and final route selectors respectively. Pulse distribution ceases whenever a test pulse $\sigma$ is received via wire $s_1$ or wire $s_2$ by a tester-blocker, since such pulse is received by the route-testing pulse detector 502 of the tester-blocker 500 and by the route-testing pulse detector 102 of the incoming indicator 100. A signal is transmitted to the programmer 101 of the incoming indicator via wire 103, and such programmer transmits a signal via wire 104 to distributor 105. Upon the receipt of such signal distributor 105 interrupts the distribution of the $\pi$ and $\sigma$ pulses to the various preselection route selectors and transmits an unblocking signal via wire 106 to whichever of the preselection route selectors which corresponds to the time position occupied by the pulse $\sigma_i$ which caused the route testing. The incoming indicator is therefore connected by a potential on wire 106 to whichever preselection route selector did the route testing and denoted the junctor used for the connection. An appropriate potential on the wire 106 opens the five gating circuits 313 which are adapted to transfer the number $n$ of the tester-blocker and the 6 gating circuits 311 and 6 gating circuits 312 for transferring respectively the twenties digit $v_1$ of order one and the twenties digit $v_0$ of order zero.

(b) The incoming indicator is connected to the tester-blocker. As already described, upon the discovery of a calling subscriber in the subscriber selection stage, the tester-blocker received a signal A from programmer 26. Such signal A, which is transmitted via wire 27, is detected by the detector circuit 508 which via wire 509 transmits a signal to programmer 501. When the same receives, simultaneously with the latter signal, a signal via wire 503 from the route-testing pulse detector 502, the programmer 501 applies a potential to wire 506 to open the gating circuits 511, 512 and 513. Only a single gating circuit 511 is illustrated in order not to overburden the drawing, but in practice, 6 such circuits are provided since 6 binary digits are required to transmit each of the numbers $v_1$ and $v_0$ (or $V_1$ and $V_0$) in "three amongst six" parallel code. Similarly, only one gating circuit 513 is shown but in practice the number is greater and depends upon the code used to transmit the tester-blocker number $n$ by means of the code generator 510. The reason for this is that there are 25 tester-blockers, and so 5 binary digits are required to transmit their numbers $n$ in conventional binary code. The potential applied to wire 506 opens the gating circuits 511–513, and so the tester-blocker 500 is connected to the incoming indicator 100.

(c) By means of the incoming indicator, the calling subscriber's code and the called subscriber's code are transmitted to the preselection route selector from the subscriber selection stages respectively covering the calling and called subscribers. Since the gating circuit 512 is open, a signal T is transmitted via wire 28 by generator 107 to the programmer 26, and after the transmission of signal T the gating circuit 111 is opened by wire 108. As already described, the programmer, upon receipt of the signal T, gave an order to the code transmitter 30 to transmit the number $v_1$ (or $V_1$ for final selection) via wires 51–56; such number is stored in memory 304 since gates 511, 111 and 311 are open. The programmer 101, when informed of the transfer of the number $v_1$ (or $V_1$) by the gating control circuit 110, gives another order to generator 107 to transmit a signal T and opens gating circuits 112, 113 via wire 109; the second twenties digit $v_0$ (or $V_0$) and the tester-blocker number $n$—i.e. the number of the subscriber selection stage covering the calling subscriber (or the called subscriber in the case of final selection)—are stored in memory 304. The programmer, when informed of the transfer of the number $v_0$ (or $V_0$) by the transfer control circuit 110, order generator 107 to transmit a signal L which passes through the open gate 514 and is applied to the programmer 501. The same cancels the opening potential operative upon the gating circuits 511–514 (such potential having been applied via wire 506), the same close and the tester-blocker 500 releases. Having ordered the transmission of the signal L, the programmer 101 transmits via wire 104 an order to the distributor 105 to resume distribution of the pulses $\pi$ and $\sigma$ and to cease applying the gate-opening potential to wire 106. Since the transmitted digits are stored in memory 304 of the preselection route selector, the programmer of the latter informs the computer 600 correspondingly via wire 357 and the preselection route selector is released thereby one the information in its memory has been transferred via the wires 356.

(d) The incoming indicator also helps to check the identity of the called subscriber in a manner which will be described hereinafter when the outgoing indicator is described.

The outgoing indicator OI has terminals which will be called input terminals (although outgoing signals appear on a very few of them) which are multiple-connected to the four final route selectors. The outgoing indicator also has terminals which will be called output terminals (although incoming signals appear on a very few of them) which are multiple-connected to the 25 tester-blockers.

The outgoing indicator performs a number of jobs:

(a) It connects itself to a final route selector which is searching for a subscriber selection stage. Such selector receives a marking signal via wire 457 from computer 600. Such signal actuates the generator 407 to transmit a signal P. The outgoing indicator 200 has a distributor 205 which distributes gate-opening signals to the wires 206 associated with the various final route selectors. The gating circuits 414 of the four final route selectors open cyclically, and the signal P passing through the gating circuit 414 is detected by the P-signal detector 202 which transmits a signal via wire 203 to programmer 201. The same transmits a signal via wire 204 to distributor 205 which applies a gate-opening potential to wire 206 of whichever final route selector has been seized. Also, decoder 207 receives the number N via the open gating circuit 413. Only one gating circuit 413 is shown, just as only one gating circuit 513 was shown, but gating circuits 413 are of course provided to the number of binary digits in the number N (there are 5 gating circuits for $N=25$). The decoder 207 applies a marking potential to the wire 216 extending to whichever tester-blocker 500 whose number is N.

(b) The called subscriber's code is transmitted via the outgoing indicator.

Programmer 201 transmits a signal to a generator 212 which transmits a signal Q. Generator 212 transmits via the open gating circuit 517 and the wire 518 a signal Q to programmer 501 which transmits a return signal Q via wire 515 and the open gating circuit 516 and applies a gate-opening potential to wire 506 to open gate 512. Generator 107 transmits a signal C to programmer 26 of the satellite exchange via wire 28. As already described, upon receipt of a signal C the programmer 26 blocked the register 23 via the wire 33. Programmer 201 then transmits a signal via wire 208 to open gating circuit 415, the opening of which had been prepared by the seizing potential of the final route selector being applied by the outgoing indicator to wire 206; the last-mentioned signal passes through the or-gate circuit 417 and opens the gating circuit 411. The number $V_1$ is transmitted to the code receiver 31 via the open gating circuit 411, the or-gate circuit 419, the open gating circuit 521 and the wires 41–46. As already described, after reception of the number $V_1$ first in code receiver 31 and then in the subscribers' lines address register 23, programmer 26 transmitted a signal R via wire 27. Such signal R is received by the detector 210 which detects the signals Q, R and A. The programmer 201, advised of receipt via wire 211, transmits a signal via wire 209 to open gating circuit 416 whose opening had been prepared by the seizing potential of the final route selector being applied to wire 206 by the outgoing indicator; the last-mentioned signal passes through the or-gate circuit 418 and opens the gating circuit 412. The number $V_0$ is transmitted to the code receiver 31 via the open gating circuit 412, the or-gate circuit 419, the open gating circuit 521 and the wires 41–46.

Upon transfer of the numbers $V_1$ and $V_0$ into the register 23, the same and the decoder associated therewith mark the line equipment 21 associated with the called subscriber, and the state detector 25 receives a signal which it transfers to the programmer 26. The row electromagnets corresponding to the tens digits and units digit of the called subscriber are operated by way of the coding and marking circuit 38. Final route selecting is then effected in the manner just described. When the tester-blocker 500 and simultaneously the incoming indicator 100 receive a route testing pulse via wire $s_2$, distribution of the $\pi$ and $\sigma$ pulses to the various preselection and final route selectors is stopped; a first signal T is transmitted via wire 28 to programmer 26 (more correctly speaking, such signal is transmitted by generator 107 through the gating circuit 512 controlled by the tester-blocker), so that the number $V_1$ is transferred into memory 304. The tester-blocker then transmits a second signal T to transfer the number $V_0$ and the number N to memory 304. Therefore, if there has been no mistake the same numbers $V_1$, $V_0$, N should now be registered in the two memories 304, 404.

(c) The outgoing indicator checks the number of the called subscriber.

The incoming indicator, advised that the called subscriber's number has been transferred into memory 304 by transfer control circuit 110, transmits over wire 118 a first signal which passes through gating circuit 314 and prepares the opening of the gating circuits 321 and 411 (there are 6 gating circuits 321 and 6 gating circuits 411); the binary digits of the number $V_1$ which are contained in the memory 304 pass through the gating circuits 321 and reach the checking circuit 120 via the wires 121, and the digits of the number $V_1$ which are contained in the memory 404 pass through the gating circuits 411 and reach checking circuit 120 via wires 122. Similarly the binary digits of the number $V_0$ pass through the gating circuit 322 and the digits of the number $V_0$ pass through the gating circuits 412. The checking circuit 120 compares the two groups of numbers and, in the event of identicity therebetween, transmits a signal via wire 123 to programmer 101. No details of a checking circuit will be given here since circuits of this kind are familiar in the art and usually comprise two flip-flop memories, and coincidence circuits to a number equal to the number of flip-flops in each memory, the coincidence circuit inputs being connected to the outputs of two flip-flops of like rank of the two memories, while the coincidence circuit outputs are connected to a final coincidence circuit. Each coincidence circuit delivers a signal upon receipt of the same digit at both its inputs, and the final coincidence circuit delivers a signal upon the receipt of signals simultaneously at all its inputs.

After the result of the checking is found to be positive, the programmer 101 orders generator 107 to transmit a signal L which, as already described, releases the tester-blocker 500 on the incoming indicator side. The preselection route selector 300 is released by programmer 101 transmitting a signal via wire 104 so that the distributor 105 distributes pulses cyclically and the unblocking potential operative on wire 106 is cancelled. The final route selector is released by a signal transmitted via wire 124 by the checking circuit 120 to the programmer 201 and by a signal transmitted by programmer 201 to distributor 205 via wire 204 which cancels the unblocking potential operative on wire 206. When the called subscriber's cut-off relay picks up upon the application of a potential to wire $c$, the state detector 25 ceases to receive a signal; the programmer 26 is advised correspondingly and stops transmission of the signal A.

As has been described, the numbering was registered by the junctor 700 and the called subscriber's number was scanned by scanner 613 and detected by state detector 615 and finally registered in the computer 600. If the same finds that the called subscriber is not a local subscriber—i.e. is not connected to any of the 25 subscriber selection stages but is a subscriber of some other central exchange—the computer 600 selects a toll call junctor 800 through the agency of the local junctor and toll call junctor marking distributor 603. The computer 600 releases the local junctor 700 seized by the calling subscriber by transmitting a release signal through the distributor 603 and the decoder 604 and substitutes for local junctor 700 the toll call junctor 800 whose output is connected to the required central exchange and whose input must now be connected to the calling subscriber. To this end, the calling subscriber, whose number is registered in the computer as already described, is found and connected to the toll call junctor 800 in exactly the same way as the called subscriber was found and connected to the local junctor. To make the connection process quite clear the details thereof are being repeated here, but in the foregoing it would be adequate to replace the local junctor by the toll call junctor and the called subscriber by the calling subscriber.

Via wires 456 computer 600 gates the twenties number $\nu_1$ of order one, the twenties number $\nu_0$ of order zero and the subscribers' selection stage number $n$ of the calling subscriber to memory 404 of the final route selector 400 and also transmits an order via wire 457 to programmer 401 of the final route selector. The same is then connected to the tester-blocker 500 whose number $n$ is registered in memory 404, continuity of the wires 41–46 being restored by the gating circuits 521 being opened via a wire 216. Via wire 454 programmer 401 orders memory 404 to transfer the number $\nu_0$ and $\nu_1$ to the code receiver 31 via the wires 41–46 whose continuity has just been restored. The tester-blocker 500 transmits a first signal (signal C) to programmer 26 via wire 28. The same then transmits a first signal via wire 36 to code receiver 31 which gates the twenties number $\nu_1$ of order one to the subscriber's line address register 23. Upon receipt of the number $\nu_1$ the programmer 26 transmits a signal R to the tester-blocker via the wire 27. A second signal C is transmitted to the programmer 26 which initiates the gating into the register 23 of the twenties number $\nu_0$ of order zero. The register 23 and the associated decoder then mark the line equipment 21 of the calling subscriber, and the state detector 25 receives a signal which it transfers to the programmer 26. The row electromagnets corresponding to the tens digit and units digit of the calling subscriber are operated. As in the case of a calling subscriber calling a local called subscriber, the programmer 26 transmits via wire 27 a signal A to the tester-blocker 500 to advise the same that a final route must be selected. As previously, the tester-blocker transmits an order to the programmer 401 which transmits shift pulses to the trunk address register 423. When a gating circuit 451 marked simultaneously by way of its wire $f$ and of its wire $q$ is found, the trunk number is transferred to the trunk marking circuit 438, with the result that the row electromagnets of the group selection stage pick up, and the calling subscriber's number is transferred to the memory 304 of the preselection route selector 300 and compared with the same number stored in memory 404 of the final route selector. If the comparison is satisfactory, the final route selector, before releasing, transmits a signal via wire 458 to computer 600 and the same marks the wire $c$ of the to call junctor 800. The column electromagnets in the subscribers' selection stage and group selection stage therefore operate.

In the foregoing, it was often said that a programmer having received one or more signals, initiates a new switching step by sending an initiating signal. Programmers adapted to initiate steps the conditions of which depend upon the termination of previous steps by logical Boolean equations are well known in the art and will not be described herein in detail. Precisions on said programmers are given by way of examples in the U.S. patent above-referred to.

What we claim is:

1. An electronically controlled switching network comprising crossbar subscribers' selection stages forming satellite exchanges and crossbar group selection stages forming a central exchange spaced apart from one another, junctors located in said central exchange constituting terminal circuits of preselection routes through the subscribers' selection stages and input circuits of final routes through the group selection stages and subscribers' selection stages in cascade, satellite-central trunks between said subscribers' selection stages and said junctors, connection lines between said junctors and said group selection stages, central-satellite trunks between said group selection stages and said subscribers' selection stages, said subscribers' selection stages having row electromagnets and column electromagnets operating crosspoints connecting subscribers to said junctors and said central-satellite trunks to subscribers, said group selection stages having row electromagnets and column electromagnets operating crosspoints connecting said junctors to said central-satellite trunks, a subscriber searching device, first means controlled by said subscriber searching device for operating the row electromagnets of the subscribers' selection stages, a central-satellite trunk searching device, second means controlled by said central-satellite trunk searching device for operating the row electromagnets of the group selection stages, a plurality of preselection wires between the subscribers' selection stages and the junctors, means controlled by said first row electromagnet operating means for marking a number of said preselection wires, a first electronic selector for selecting one among said marked preselection wires and marking the junctor connected thereto, whereby the column electromagnets of the subscribers' selection stages adapted to connect a given calling subscriber to the marked junctor are derived from the selected preselection wire, a first plurality of final selection wires between the subscribers' selection stages and the group selection stages, means controlled by said first row electromagnet operating means for marking a number of said first plurality of final selection wires, a second plurality of final selection wires inside the group selection stages, means controlled by said second row electromagnet operating means for marking a number of said second plurality of final selection wires, a second electronic selector for selecting one first and one second wire among said marked final selection wires whereby the column electromagnets of the subscribers' selection stages and of the group selection stages adapted to connect a given called subscriber to the marked junctor are derived from the selected final selection wires and means for energizing said column electromagnets.

2. An electronically controlled switching network according to claim 1 in which the preselection wires extend via make contacts of a subscribers' selection stage electromagnet denoting the calling subscriber to be connected and via break contacts of column electromagnets which must operate to connect to a junctor the said calling subscriber, the first plurality of final selection wires extend via make contacts of a subscribers' selection stage electromagnet denoting the called subscriber to be connected and via break contacts of column electromagnets which must operate to connect the said called subscriber to a central satellite trunk and the second plurality of final selection wires extend via make contacts of a group selection stage electromagnet denoting a central satellite trunk and via break contacts of those column electromagnets which must operate to connect such central satellite trunk to said junctor.

3. An electronically controlled switching network comprising a plurality of crossbar subscribers' selection stages forming satellite exchanges and crossbar group selection stages forming a central exchange, select row electromagnets and hold column electromagnets in said crossbar subscribers' selection stages, select row electromagnet and hold column electromagnets in said crossbar group selection stages, junctors located in said central exchange constituting terminal circuits of preselection routes through the subscribers' selection stages and input circuits of final routes through the group selection stages and subscribers' selection stages in cascade, satellite-central trunks between said subscribers' selection stage and said junctors, preselection wires respectively comprised in each of said satellite-central trunks, a first plurality of control wires respectively comprised in each of said satellite-central trunks and respectively associated with said preselection wires for selectively energizing the hold column electromagnets of the crossbar subscribers' selection stages, central-satellite trunks between said group selection stages and said subscribers' selection stages, a first plurality of final selection wires respectively comprised in each of said central-satellite trunks, a second plurality of control wires respectively comprised in each of said central-satellite trunks and respectively associated with one of said first plurality of final selection wires for selectively energizing the hold column electromagnets of the group selection stages, connection lines between said junctors and said group selection stages, a second plurality of final selection wires respectively comprised in each of said connection lines and respectively associated with one of said second plurality of control wires, a subscriber searching device, first means controlled by said subscriber searching device for selectively energizing the select row electromagnets of the subscribers' selection stages and selectively marking a number of said preselection wires and of said first plurality of final selection wires, a central-satellite trunk searching device, second means controlled by said central-satellite trunk searching device for selectively energizing the select row electromagnets of the group selection stages and selectively marking a number of said second plurality of final selection wires, first selector means for selecting one among the marked preselection wires and energizing the control wire of said first plurality of control wires associated therewith and second selector means for simultaneously selecting one among the marked wires of said first plurality of final selection wires and one among the marked wires of said second plurality of final selection wires and energizing the control wire of said second plurality of control wires associated therewith.

4. An electronically controlled switching network comprising a plurality of crossbar subscribers' selection stages forming satellite exchanges and crossbar group selection stages forming a central exchange, select row electromagnets and hold column electromagnets in said crossbar subscribers' selection stages, select row electromagnet and hold column electromagnets in said crossbar group selection stages, junctors located in said central exchange constituting terminal circuits of preselection routes through the subscribers' selection stages and input circuits of final routes through the group selection stages and subscribers' selection stages in cascade, satellite-central trunks between said subscribers' selection stage and said junctors, preselection wires respectively comprised in each of said satellite-central trunks, a first plurality of control wires respectively comprised in each of said satellite-central trunks and respectively associated with said preselection wires for selectively energizing the hold column electromagnets of the crossbar subscribers' selection stages, central-satellite trunks between said group selection stages and said subcribers' selection stages, a first plurality of final selection wires respectively comprised in each of said central-satellite trunks, a second plurality of control wires respectively comprised in each of said central-satellite trunks and respectively associated with one of said first plurality of final selection wires for selectively energizing the hold column electromagnets of the group selection stages, connection lines between said junctors and said group selection stages, a second plurality of final selection wires respectively comprised in each of said connection lines and respectively associated with one of said second plurality of control wires, registering means in said central exchange, two supernumerary trunks between each satellite exchange and the central exchange for transmission of the code of a subscriber to be connected, a subscriber searching device per satellite exchange, first means controlled by said subscriber searching device for selectively energizing the select row electromagnets of the subscribers' selection stages and selectively marking a number of said preselection wires and of said first plurality of final selection wires, a central-satellite trunk searching device, second means controlled by said central-satellite trunk searching device for selectively energizing the select row electromagnets of the group selection stages and selectively marking a number of said second plurality of final selection wires, a first gating circuit inserted in said first supernumerary trunk, first selector means for selecting one among the marked preselection wires, energizing the control wire of said first plurality of control wires associated therewith and controlling said first gating means, a second gating circuit inserted in said second supernumerary trunk and second selector means for simultaneously selecting one marked wire of said first plurality of final selection wires and one marked wire of said second plurality of final selection wires, energizing the control wire of said second plurality of control wires associated therewith and controlling said second gating means.

5. An electronically controlled switching network comprising a plurality of crossbar subscribers' selection stages forming satellite exchanges and crossbar group selection stages forming a central exchange, select row electromagnets and hold column electromagnets in said crossbar subscribers' selection stages, select row electromagnet and hold column electromagnets in said crossbar group selection stages, junctors located in said central exchange constituting terminal circuits of preselection routes through the subscribers' selection stages and input circuits of final routes through the group selection stages and subscribers' selection stages in cascade, satellite-central trunks between said subscribers' selection stage and said junctors, preselection wires respectively comprised in each of said satellite-central trunks, a first plurality of control wires respectively comprised in each of said satellite-central trunks and respectively associated with said preselection wires for selectively energizing the hold column electromagnets of the crossbar subscribers' selection stages, central-satellite trunks between said group selection stages and said subscribers' selection stages, a first plurality of final selection wires respectively comprised in each of said central-satellite trunks, a second plurality of control wires respectively comprised in each of said central-satellite trunks and respectively associated with one of said first plurality of final selection wires for selectively energizing the hold column electromagnets of the group selection stages, connection lines between said junctors and said group selection stages, a second plurality of final selection wires respectively comprised in each of said connection lines and respectively associated with one of said second plurality of control wires, registering means in said central exchange, two supernumerary trunks between each satellite exchange and the central exchange for transmission of the code of a subscriber to be connected, a subscriber searching device per satellite exchange, a memory device per satellite exchange for storing the code of a subscriber to be connected, first means controlled by said subscriber searching device for selectively energizing the select row electromagnets of the subscribers' selection stages and selectively marking a number of said preselection wires and of said first plurality of final selection wires, a central-satellite trunk searching device, second means controlled by said central-satellite trunk searching device for selectively energizing the select row electromagnets of the group selection stages and selectively marking a number of wires of said second plurality of final selection wires, a first gating circuit inserted in said first supernumerary trunk, a first memory circuit connected to said first supernumerary trunk, first selector means for selecting one among the marked preselection wires, energizing the control wire of said first plurality of control wires associated therewith, controlling said first gating means and transferring the code of a subscriber to be connected from the memory device to the first memory circuit, a second gating circuit inserted in said second supernumerary trunk, a second memory circuit connected to said second supernumerary trunk and second selector means for simultaneously selecting one marked wire of said first plurality of final selection wires and one marked wire of said second plurality of final selection wires, energizing the control wire of said second plurality of control wires associated therewith, controlling said second gating means and transferring the code of a subscriber to be connected from the second memory circuit to the memory device.

6. An electronically controlled switching network comprising a plurality of crossbar subscribers' selection stages forming satellite exchanges and crossbar group selection stages forming a central exchange, select row electromagnets and hold column electromagnets in said crossbar subscribers' selection stages, select row electromagnet and hold column electromagnets in said crossbar group selection stages, junctors located in said central exchange constituting terminal circuits of preselection routes through the subscribers' selection stages and input circuits of final routes through the group selection stages and subscribers' selection stages in cacade, satellite-central trunks between said subscribers' selection stage and said junctors, preselection wires respectively comprised in each of said satellite-central trunks, a first plurality of control wires respectively comprised in each of said satellite-central trunks and respectively associated with said preselection wires for selectively energizing the hold column electromagnets of the crossbar subscribers' selection stages, central-satellite trunks between said group selection stages and said subscribers' selection stages, a first plurality of final selection wires respectively comprised in each of said central-satellite trunks, a second plurality of control wires respectively comprised in each of said central-satellite trunks and respectively associated with one of said first plurality of final selection wires for selectively energizing the hold column electromagnets of the group selection stages, connection lines between said junctors and said group selection stages, a second plurality of final selection wires respectively comprised in each of said connection lines and respectively associated with one of said second plurality of control wires, registering means in said central exchange, two supernumerary trunks between each satellite exchange and the central exchange for transmission of the code of a subscriber to be connected, a subscriber searching device per satellite exchange, a memory device per satellite exchange for storing the code of a subscriber to be connected, first means controlled by said subscriber searching device for selectively energizing the select row electromagnets of the subscribers' selection stages and selectively marking a number of said preselection wires and of said first plurality of final selection wires, a central-satellite trunk searching device, second means controlled by said central-satellite trunk searching device for selectively energizing the select row electromagnets of the group selection stages and selectively marking a number of wires of said second plurality of final selection wires, a first gating circuit inserted in said first supernumerary trunk, a first memory circuit connected to said first supernumerary trunk, first selector means for selecting one among the marked preselection wires, energizing the control wire of said first plurality of control wires associated therewith, controlling said first gating means and transferring the code of a subscriber to be connected from the memory device to the first memory circuit, a second gating circuit inserted in said second supernumerary trunk, a second memory circuit connected to said second supernumerary trunk, second selector means for simultaneously selecting one marked wire of said first plurality of final selection wires and one marked wire of said second plurality of final selection wires, energizing the control wire of said second plurality of control wires associated therewith, controlling said second gating means and transferring the code of a subscriber to be connected from the second memory circuit to the memory device and means for comparing the contents of said first and second memory circuits.

No references cited.

KATHLEEN H. CLAFFY, *Primary Examiner.*

WILLIAM C. COOPER, *Examiner.*